(12) United States Patent
Tress

(10) Patent No.: US 7,766,502 B2
(45) Date of Patent: Aug. 3, 2010

(54) SELF-ILLUMINATED STRUCTURAL PANEL UNITS AND SYSTEMS INCLUDING THE SAME

(75) Inventor: Christopher M Tress, Poland, OH (US)

(73) Assignee: Tresco International Ltd. Co., N. Lima, OH (US)

( * ) Notice: Subject to any disclaimer, the term of this patent is extended or adjusted under 35 U.S.C. 154(b) by 122 days.

(21) Appl. No.: 11/819,507

(22) Filed: Jun. 27, 2007

(65) Prior Publication Data

US 2008/0278932 A1 Nov. 13, 2008

Related U.S. Application Data

(60) Provisional application No. 60/924,262, filed on May 7, 2007.

(51) Int. Cl.
*A47F 11/10* (2006.01)
(52) U.S. Cl. .................. 362/125; 362/133; 362/390
(58) Field of Classification Search .................. 362/92, 362/125, 127, 133, 634, 390, 192; 312/223.5, 312/235.5; 62/264
See application file for complete search history.

(56) References Cited

U.S. PATENT DOCUMENTS

| 6,231,205 | B1 * | 5/2001 | Slesinger et al. | 362/133 |
|---|---|---|---|---|
| 6,283,608 | B1 * | 9/2001 | Straat | 362/133 |
| 6,866,394 | B1 * | 3/2005 | Hutchins et al. | 362/192 |
| 7,453,419 | B2 * | 11/2008 | Yee et al. | 345/39 |
| 2002/0018342 | A1 * | 2/2002 | Shemitz et al. | 362/125 |
| 2003/0038571 | A1 * | 2/2003 | Obrock et al. | 312/408 |
| 2007/0151274 | A1 * | 7/2007 | Roche et al. | 62/246 |

OTHER PUBLICATIONS iMAGine™ Lighting System, Tresco International, NASM, Feb. 2006.

* cited by examiner

*Primary Examiner*—Stephen F Husar
*Assistant Examiner*—Peggy A. Neils
(74) *Attorney, Agent, or Firm*—Nixon & Vanderhye P.C.

(57) ABSTRACT

Position adjustable self-illuminated panel units may be used in combination with conventional shelf supports. Preferred shelf-units include a light-transmissive panel, a shelf frame holding the panel and having an illumination element for providing a light source to illuminate the panel, and a magnetic connector electrically interconnected to the illumination element and adapted to being magnetically and electrically coupled to a source of electrical power. The illumination element most preferably includes an LED strip housed within one member of the frame and positioned adjacent to an edge of the panel. A magnetic connector includes a pair of electrically conductive side panels, an electrically non-conductive spacer sandwiched between the side panels, and a pair of magnet bars fixed to the spacer. The magnet bars define an air gap therebetween such that electrical contact may be established between the magnet bars and a respective one of the side panels. Shelf lighting systems according to the present invention will most preferably include a self-illuminated panel unit as described briefly above, and a ferromagnetic power strip for supplying electrical power thereto. The magnetic connector is therefore capable of magnetic and electrical interconnection to the power strip (e.g., via the magnet bars thereof so as to in turn supply power to the panel unit (e.g., via lead wires connecting the side panels to the LED strip).

20 Claims, 6 Drawing Sheets

SELF-ILLUMINATED STRUCTURAL PANEL UNITS AND SYSTEMS INCLUDING THE SAME

CROSS-REFERENCE TO RELATED APPLICATION

The present application is based on and claims domestic priority benefits under 35 USC §119(e) from U.S. Provisional Application Ser. No. 60/924,262 filed on May 7, 2007 (the entire content of which is expressly incorporated hereinto by reference).

FIELD OF THE INVENTION

The embodiments disclosed herein relate generally to self-illuminated panel units that may be employed usefully as a structural component in a variety of systems, for example, as self-illuminated shelving, door panels, architectural and/or structural wall panels, cabinet base panels, display cases, decorative furniture, flooring panels, and the like.

BACKGROUND AND SUMMARY OF THE INVENTION

Self-illuminated panels and systems for cabinetry, display cases and/or furniture pieces (hereinafter referred to as "cabinetry" or "cabinets" for ease of reference and discussion) are in and of themselves known. Typically, the interiors of cabinets may be illuminated by a variety of techniques in the art as evidenced by U.S. Pat. Nos. 5,895,111, 5,915,824, 6,179,434, 6,283,608 and 6,325,523 (the entire content of each patent being expressly incorporated hereinto by reference). Light-conducting panels are also known as evidenced by U.S. Pat. Nos. 3,328,570, 4,914,553, 5,584,556, 6,068,382, 6,619,175 and 7,018,087 (the entire content of each patent being expressly incorporated hereinto by reference).

One problem of self-contained illuminated panels is the relative difficulty to allow for adjustable panel positioning within the cabinetry. Recently, an illuminated shelving system has been proposed in U.S. Pat. No. 7,163,305 (the entire content being expressly incorporated hereinto by reference) which provides for especially designed tracks to allow for position adjustment of the illuminated panel unit by providing integrated structural support for and an electrical supply to the panel unit to the same.

Improvements to conventional illuminated panels are still needed. For example, it would especially be desirable if illuminated panels and systems employing the same could be provided that are relatively easily manufactured. If used as a self unit, such self-illuminated panels would especially be desirable if they could be made compatible with existing adjustable shelf supports. It is towards fulfilling such needs that the present invention is directed.

Broadly, the present invention is embodied in self-illuminated structural panel units that may be employed usefully as a structural component in a variety of systems, for example, as self-illuminated shelving, door panels, wall panels, cabinet base panels, display cases, decorative furniture, flooring panels and the like. According to one aspect, self-illuminated panels are provided that may be used in combination with conventional shelf supports. According to another aspect, self-illuminated structural panel units are provided having a light-transmissive panel, a frame holding the panel and having an illumination element for providing a light source to illuminate the panel, and a connector electrically interconnected to the illumination element and adapted to being electrically coupled to a source of electrical power. The connector may be magnetic so as to also be capable of magnetic coupling to a power strip. In some preferred forms, the illumination element comprises an LED strip housed within one member of the frame and positioned adjacent to an edge of the panel.

In other embodiments of the invention, the frame includes opposed pairs of frame members each having a receiving channel for receiving respective edges of the panel. Edge gaskets for the panel are provided so as to securely mount the panel within the receiving channels of the frame. In a preferred aspect of the invention, the LED strip includes spaced-apart LED elements which are abutted against one edge of the panel, with the other edges of the panel being received within respective ones of the edge gaskets. The edge gaskets in turn are positioned within the receiving channels of respective frame members. A resilient cushion member may also be positioned within a channel of a frame member opposite to the LED strip for exerting a bias force on the panel in a direction to cause an edge of the panel to abut against the LED strip.

The magnetic connector that may be employed according to certain preferred embodiments of the invention may comprise a pair of electrically conductive side panels, an electrically non-conductive spacer sandwiched between the side panels, and a pair of magnet bars fixed to the spacer. The magnet bars define an air gap therebetween such that electrical contact may be established between the magnet bars and a respective one of the side panels. Lead wires may be provided to electrically connect the illumination element and a respective one of these side panels.

Systems according to the present invention will most preferably include a self-illuminated panel unit as described briefly above, and a power strip for supplying electrical power thereto. If provided, the magnetic connector is therefore capable of magnetic and electrical interconnection to the power strip so as to in turn supply power to the panel unit.

In especially preferred embodiments, the power strip may comprise a pair of ferromagnetic electrically conductive power bars and a layer of an insulator strip separating the power bars. The magnet bars of the magnetic connector are therefore capable of magnetic and electrical coupling to a respective one of the power bars so as to supply electrical power to the illumination element.

These and other aspects and advantages will become more apparent after careful consideration is given to the following detailed description of the preferred exemplary embodiments thereof.

BRIEF DESCRIPTION OF THE ACCOMPANYING DRAWINGS

Reference will hereinafter be made to the accompanying drawings, wherein like reference numerals throughout the various FIGURES denote like structural elements, and wherein.

DETAILED DESCRIPTION OF THE INVENTION

As noted previously, the self-illuminated panel units disclosed herein may be employed usefully as a structural component in a variety of systems, for example, as self-illuminated shelving, door panels, architectural and/or structural wall panels, cabinet base panels, display cases, decorative furniture, flooring panels, and the like. Suffice it to say that those skilled in the art may recognize other uses and/or embodiments of the self-illuminated panel units that are embraced by the scope of the pending claims. However, as a way to facilitate the description of the panel units, they will be disclosed below primarily in reference to their use as a shelf-unit for cabinetry. It will of course be understood that such a description is related to only one embodiment in which the self-illuminated panel units may be employed and is non-limiting to the scope of the present invention.

Figure 1:
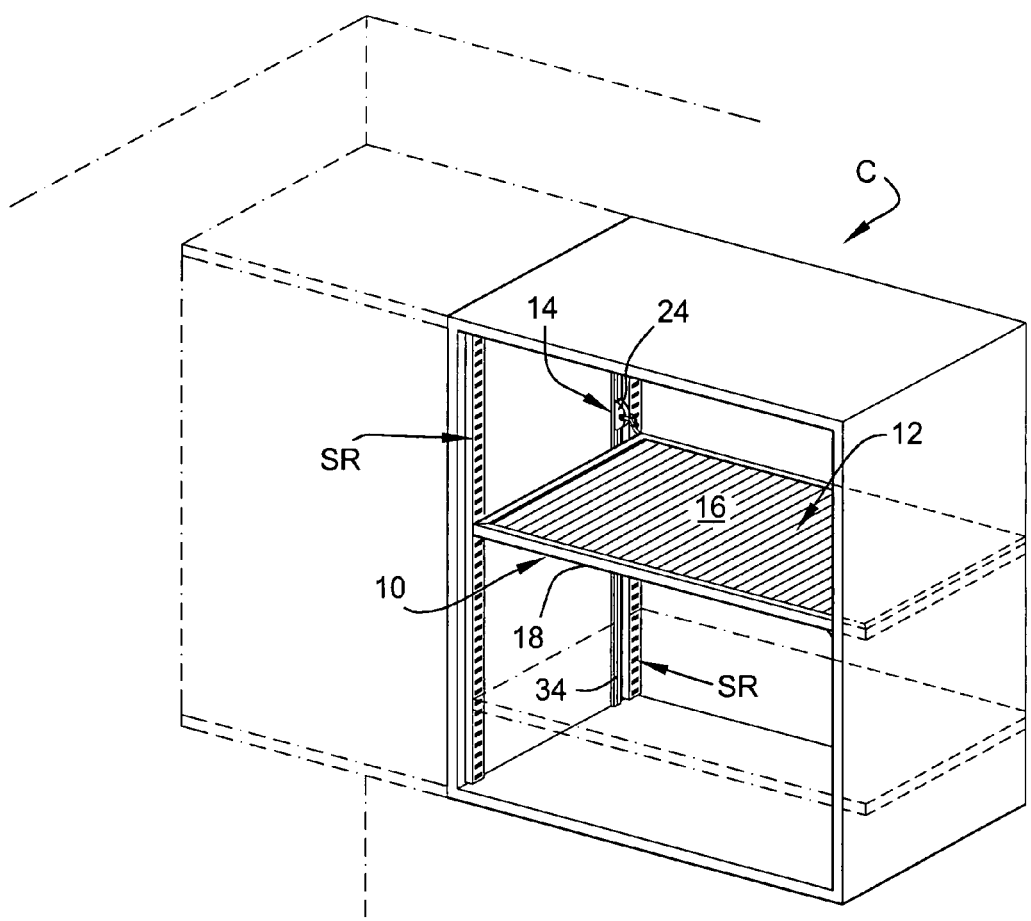
FIG. 1 is a perspective view of a cabinet provided with an illuminated shelf system in accordance with the present invention.

In this regard, an exemplary cabinet C provided with an illuminated shelf system 10 is depicted in accompanying FIG. 1. (As used herein and in the accompanying claims, the terms "cabinet" and "cabinetry" are intended to refer to any fixed or movable fully or partially enclosed cupboard-like structure for safekeeping or display of objects.) In the depicted embodiment, the shelf system 10 is generally comprised of a self-illuminating panel unit 12 and a power track assembly 14 for supplying electrical power to the panel unit 12. Cabinet C is provided with conventional slotted support rails SR having removable shelf-support brackets (not shown) inserted into the slots of the shelf support rails SR for supporting the end regions of the panel unit 12 associated with the shelf system 10. As is well known, selective positioning of the shelf-support brackets in the slots of the support rails SR will allow a user to adjust the position of the panel unit 12 within the cabinet C. Of course, other conventional shelf-adjustment means may also be employed, such as those that function to support the panel unit 12 in generally a cantilever manner by means of rear support rails and outwardly extending shelf-support brackets. Alternatively (or additionally) a linear series of recessed apertures may physically be provided integrally with (e.g., by drilling) the cabinet C so that shelf-support brackets may be inserted therein.

An embodiment of the shelf system 10 and its associated components is perhaps more clearly shown in accompanying FIGS. 2-6. As briefly noted above, the shelf system 10 generally includes a panel unit 12 and a power track assembly 14. The panel unit 12 includes a light panel 16 having light-transmissive properties fixed to a surrounding frame 18 comprised of opposed pairs of frame members 18-1, 18-2. The light panel 16 may thus be formed of a transparent or translucent plastic or glass material and may be provided with a series of chemically or mechanically etched lines (a few of which are identified by reference 16-1 in FIG. 2) to assist in the propagation of light therethrough. Also, various symbols/patterns may be etched on plastic or glass (in addition to lines) so as to assist in the propagation of light through the light panel 16.

Each of the frame members 18-1, 18-2 which comprise the frame 18 is most preferably formed of a rigid plastics or metal material. In a preferred embodiment, the frame members 18-1, 18-2 are formed of a class 1 anodized aluminum having a channel 18-3 therein for receiving respective edges of the light panel 16 as well as other component parts of the shelf system 10 to be discussed in greater detail below.

An LED (light emitting diode) strip 20 is preferably provided as a light source for the light panel 16. The LED strip 20 is in and of itself conventional in that it includes a plurality of individual LED elements 20-1 operatively associated with a PCB (printed circuit board) support 20-2. Electrical power is provided to the PCB support 20-2 (and hence to the LED elements 20-1) by a pair of lead wires 22 electrically connected to the magnetic connector 24 (see FIGS. 2 and 3).

The lead wires 22 are preferably surrounded by a heat shrink wrap tube 23 which extends from the vicinity of the PCB support 20-2 to the magnetic connector 24. The lead wires 22 with the shrink wrap tube 23 exit the system 10 through the mitered corner of the frame members 18-1 and 18-2, one of which (e.g., frame member 18-1) includes access openings 25 to allow the lead wires 22 and the surrounding shrink wrap tube 23 to extend to the connector 24. The access openings 25 on one side of the mitered corner connection of the frame members 18-1,18-2 and the heat shrink wrapped tube 23 surrounding the lead wires 22 collectively provide strain relief of the lead wires 22 exiting the system 10.

The PCB support 20-2 is most preferably housed within the receiving channel 18-3 one of the frame members 18-1 (but it could alternatively be housed within a channel 18-3 of one of the other frame members 18-2). Structural integrity is provided to the PCB support 20-2 by a rigid or semi-rigid support backing bar 26. Most preferably, the backing bar 26 is formed of the same material as the frame 18, which in the preferred embodiment depicted is aluminum. An elastomeric stop 28 (see FIG. 2) is also provided in abutting relationship to the end of the PCB support 20-2 and backing bar 26 opposite end connected to the lead wires 22.

Figure 5:
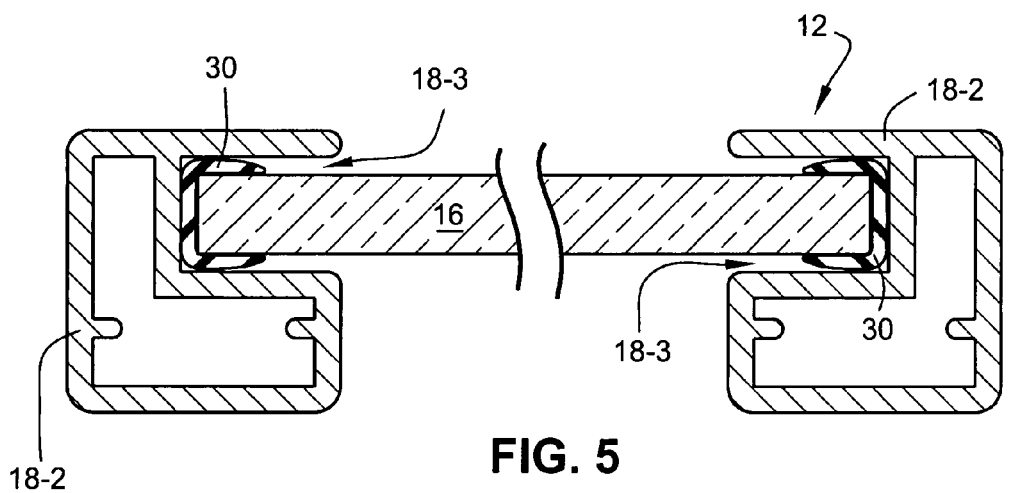
FIG. 5 is a cross-sectional view of the panel unit depicted in FIG. 4 as taken along line 5-5 therein.
Figure 6:
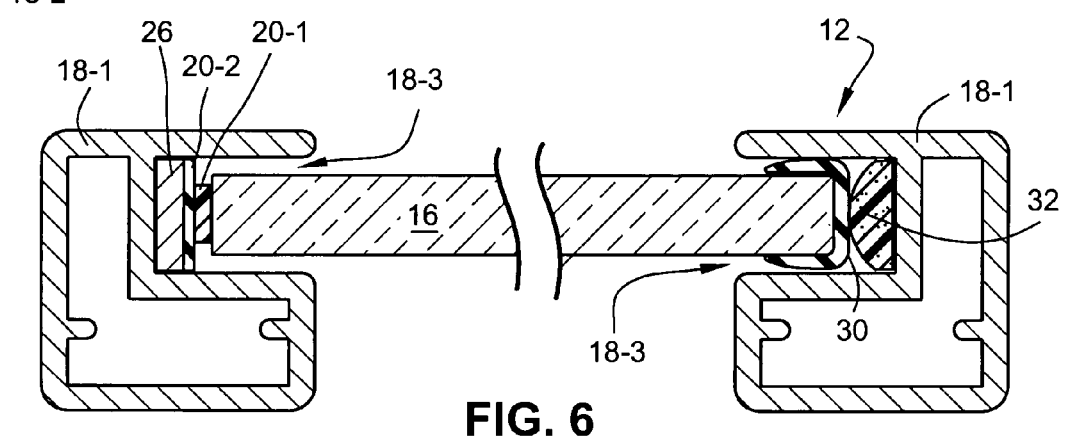
FIG. 6 is cross-sectional view of the panel unit depicted in FIG. 4 as taken along line 6-6 therein.

As shown in FIGS. 5 and 6, the LED elements 20-1 are abutted against an edge of the shelf panel 16 within the channel 18-3 of frame member 18-1. However, the edge of panel 16 opposite to the LED elements 20-1 and all other remaining edges of the panel 16 are received within a pliant U-shaped gasket 30 so as to provide a reliable and stable mounting of the panel 16 within the channels 18-3 of the frame members 18-1,18-2. It will also be observed in FIG. 6 that channel 18-3 of that frame member 18-1 opposite to the LED strip 20 includes a resilient cushion strip 32 sandwiched between the frame member 18-1 and the gasket 30 enveloping an adjacent edge of the panel 16. The cushion element serves to provide a slight but meaningful bias force against the adjacent edge of the panel 16 in a direction which encourages the opposite edge of the panel to remain in abutted relationship with the LED elements 20-1.

Figure 2:
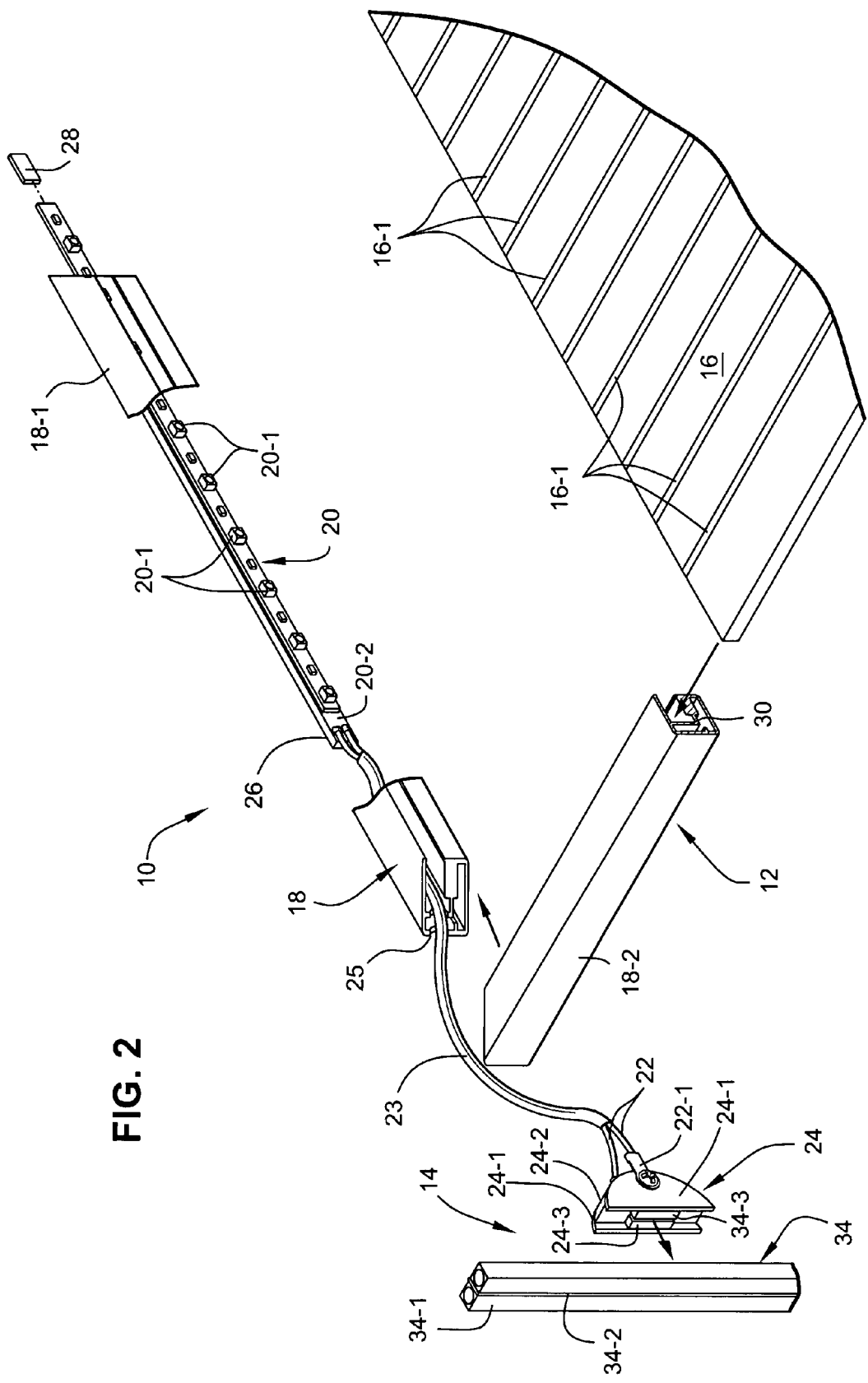
FIG. 2 is an exploded partial perspective of a presently preferred embodiment of an illuminated shelf system in accordance with the present invention.
Figure 3:
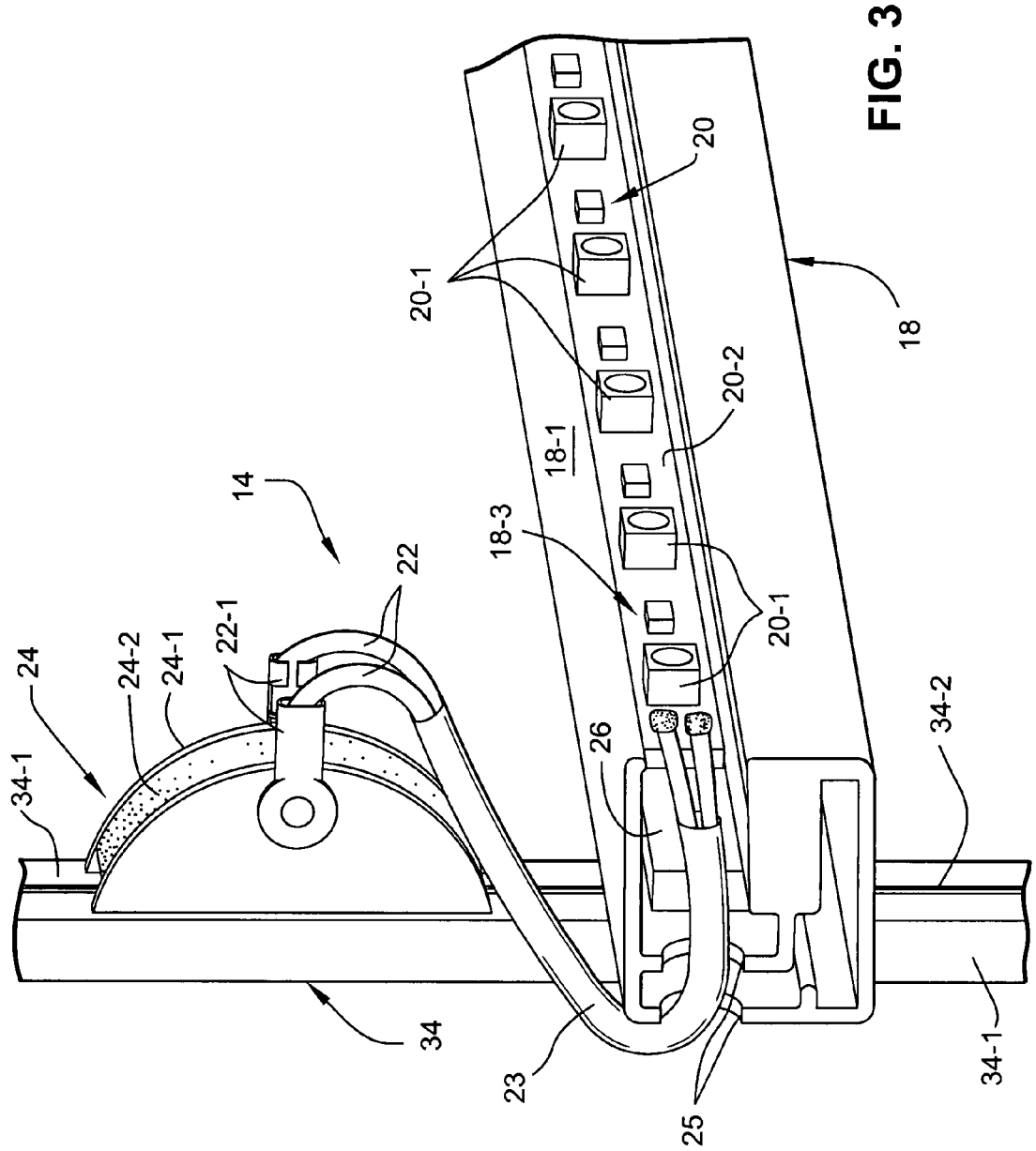
FIG. 3 is an enlarged perspective sectional view of the electrical connection between an illuminated panel unit and its operatively associated magnetic electrical connector in accordance with the present invention.
Figure 4:
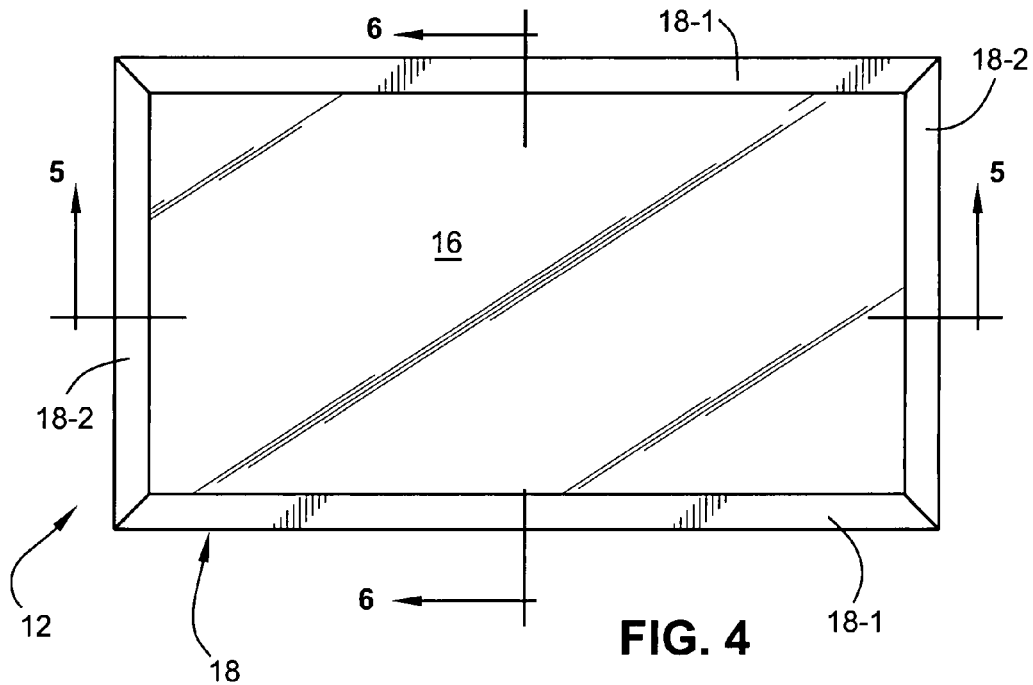
FIG. 4 is a plan view of a panel unit in accordance with the present invention.

The power track assembly 14 includes generally the previously mentioned magnetic connector 24 and a power strip 34 (see FIGS. 2 and 3). The magnetic connector 24 is comprised of a pair of electrically conductive side panels 24-1 and an electrically non-conductive spacer 24-2 sandwiched therebetween. A pair of magnet bars 24-3 (see FIG. 2) are fixed to the face of the spacer 24-2 in such a manner that an air gap is present between the magnet bars 24-3 but each is in electrical contact with a respective one of the side panels 24-1. As briefly noted above, the magnetic connector 24 is connected to one end of the lead wires 22 (e.g., by means of conventional terminal connector elements 22-1).

The power strip 34 is comprised of a pair of ferromagnetic electrically conductive power bars 34-1 separated from one another by a layer of an insulator strip 34-2. The power bars 34-1 are adapted for connection operatively to a source of electrical power by any conventional means not shown well understood by those skilled in the electrician's art (e.g., by means of conventional terminal connectors associated with a power plug for being inserted into a household electrical power receptacle). The magnet bars 24-3 are thus capable of being magnetically coupled to respective ones of the power bars 34-1 to thereby in turn establish electrical connection between the power bars 34-1 and the lead wires 22 (i.e., via the electrical contact between the magnet bars 24-3 and the side panels 24-1). In such a manner therefore, electrical power is supplied to the LED strip 20 causing the LED elements 20-1 to illuminate. Illumination of the LED elements 20-1 is thus propagated through the panel 16 thereby providing for a self-illuminated panel unit 12.

When the relative position of the panel unit 12 is desired to be adjusted within the cabinet C, a user need only magnetically disconnect the connector 24 from the power strip 34 and then reposition the support brackets (not shown) within different slots associated with the track supports TS. Once the panel unit 16 has been repositioned within the cabinet C, the connector 24 can then simply be magnetically reconnected to the power strip 34 at a location different from its previous connection.

Figure 7:
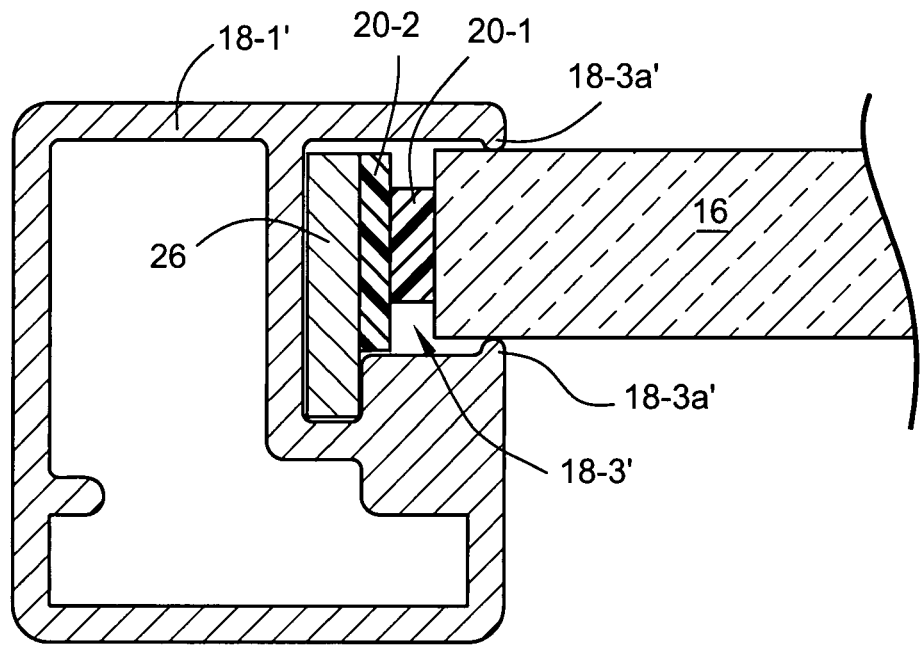
FIG. 7 is an enlarged partial cross-sectional view of another embodiment of a panel unit according to the present invention.
Figure 8:
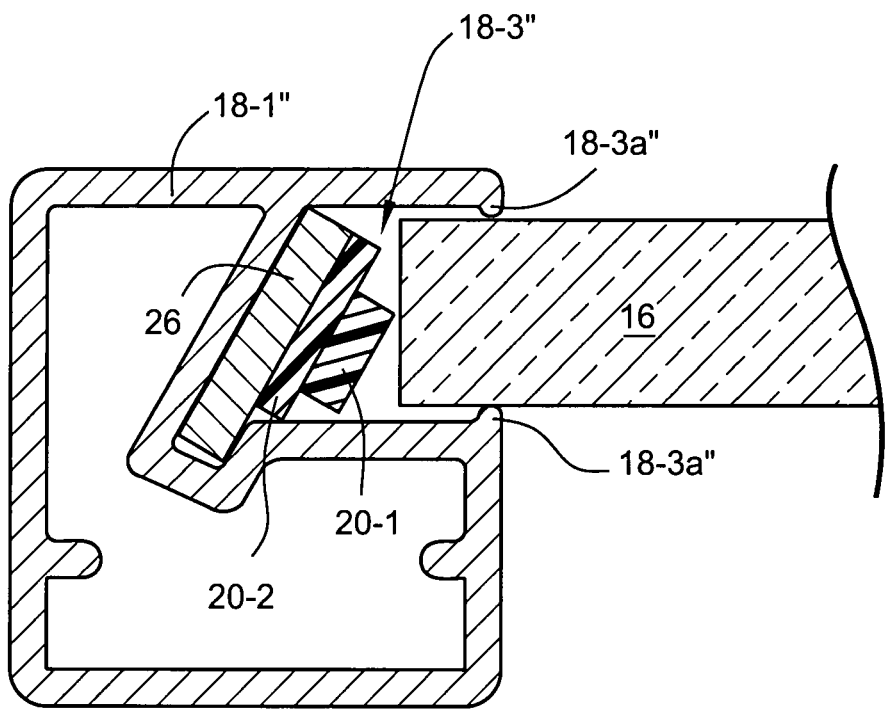
FIG. 8 is an enlarged partial cross-sectional view of yet another embodiment of a panel unit according to the present invention.

Accompanying FIGS. 7 and 8 depict other possible cross-sectional profiles of the frame 18. Thus, as shown in FIG. 7, the channel 18-3' associated with frame member 18-1' may include channel lips 18-3a' so as to provide a tighter fit with the panel 16. The channel 18-3" associated with frame member 18-1" shown in FIG. 8 may be angled relative to the panel 16 and provided with panel lips 18-3a".

Figure 9:
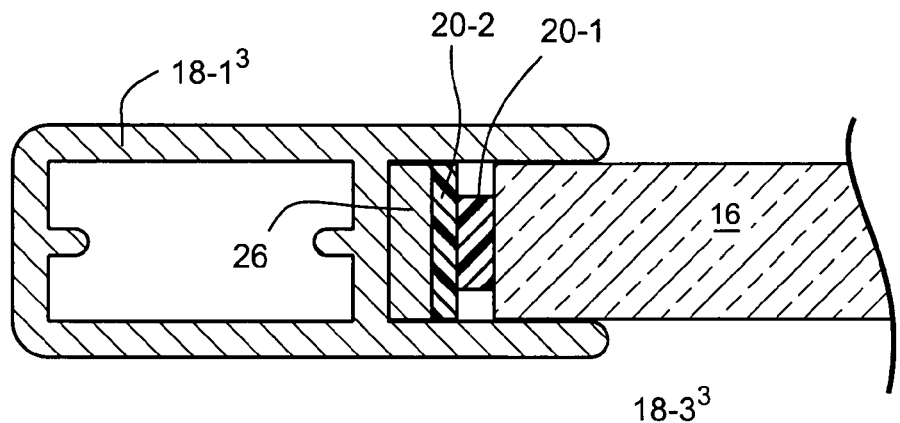
FIGS. 9-11 are each enlarged partial cross-sectional views of other panel unit embodiments of the present invention.
Figure 10:
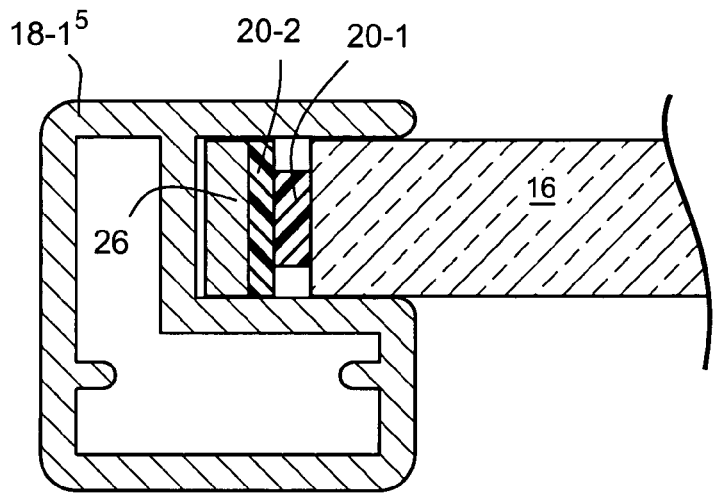
Figure 11:
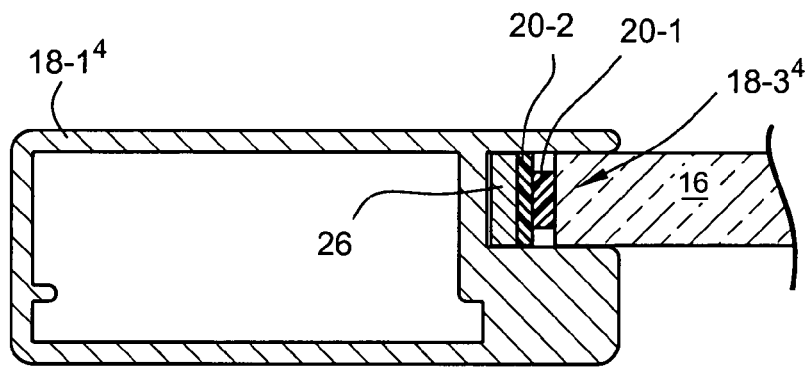

FIGS. 9-11 depict further alternative cross-sectional profiles that may be employed for the frame 18. In this regard, as shown in FIGS. 9 and 11, the frame members 18-1³ and 18-1⁴ may be generally rectangularly shaped in cross-section and have a generally full-height channel (e.g., channel 18-3³ in FIG. 9) or an asymmetric channel height (e.g., channel 18-3⁴ in FIG. 11). The generally square frame member 18-1⁵ shown in FIG. 10 is somewhat similar to the embodiments depicted in FIGS. 7 and 8 but differs principally in that there is no provision for a recessed slot to receive a portion of the support backing bar 26. Suffice it to say that those skilled in the art may recognize even further cross-sectional variations and/or embodiments that may satisfactorily be employed without departing from the scope of the present invention.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. A self-illuminated panel unit comprising:
   a light-transmissive panel;
   a frame holding the panel and having an illumination element for providing a light source to illuminate the panel; and
   a magnetic connector electrically interconnected to the illumination element and adapted to being magnetically and electrically coupled to a source of electrical power, wherein the magnetic connector comprises:
   (i) a pair of electrically conductive side panels;
   (ii) an electrically non-conductive spacer sandwiched between the side panels; and
   (iii) a pair of magnet bars fixed to the spacer in such a manner that an air gap is present between the magnet bars and such that electrical contact is established between the magnet bars and a respective one of the side panels.

2. A self-illuminated panel unit as in claim 1, wherein the illumination element comprises an LED strip housed within one member of the frame and positioned adjacent to an edge of the panel.

3. A self-illuminated panel unit as in claim 2, wherein the frame includes opposed pairs of frame members each having a receiving channel for receiving respective edges of the panel.

4. A self-illuminated panel unit as in claim 3, further comprising edge gaskets for the panel, wherein the LED strip includes spaced-apart LED elements which abut an edge of the panel, and wherein other edges of the panel are received within respective ones of the edge gaskets, the edge gaskets in turn being positioned within the receiving channels of respective frame members.

5. A self-illuminated panel unit as in claim 1 or 4, further comprising a resilient cushion member received within a channel of a frame member opposite to the LED strip for exerting a bias force on the panel in a direction to cause an edge of the panel to abut against the LED strip.

6. A self-illuminated panel unit as in claim 1, further comprising lead wires electrically connecting the illumination element and a respective one of the side panels.

7. A self-illuminated panel unit comprising:
   a light-transmissive panel;
   a frame having a channel for holding respective edges of the panel;
   an illumination element received within the channel of the frame for providing a light source to illuminate the panel, and
   a magnetic connector electrically interconnected to the illumination element and adapted to being magnetically and electrically coupled to a source of electrical power, wherein
   the illumination element comprises an LED strip housed within the channel of the frame and positioned adjacent to one edge of the panel, and wherein
   the panel unit further comprises a resilient cushion member received within the channel of the frame member at a position opposite to the LED strip for exerting a bias force on another edge of the panel in a direction to cause the one edge of the panel to abut against the LED strip, wherein the magnetic connector comprises:
   (i) a pair of electrically conductive side panels;
   (ii) an electrically non-conductive spacer sandwiched between the side panels; and
   (iii) a pair of magnet bars fixed to the spacer in such a manner that an air gap is present between the magnet bars and such that electrical contact is established between the magnet bars and a respective one of the side panels.

8. The panel unit of claim 7, further comprising edge gaskets for the panel, wherein the LED strip includes spaced-apart LED elements which abut the one edge of the panel, and wherein other edges of the panel are received within respective ones of the edge gaskets, the edge gaskets in turn being positioned within the receiving channel of the frame member.

9. The panel unit as in claim 7, further comprising lead wires electrically connecting the illumination element and a respective one of the side panels.

10. The panel unit as in claim 9, further comprising shrink wrapped tubing around the lead wires.

11. A shelf lighting system comprising:
a self-illuminated panel unit;
a power strip for supplying electrical power, and
a magnetic connector electrically interconnected to the self-illuminated panel unit and being capable of magnetic and electrical coupling to the power strip to provide electrical power to the self-illuminated panel unit, wherein
the self-illuminated panel unit comprises:
(a) a light-transmissive panel;
(b) a frame holding the panel and having an illumination element for providing a light source to illuminate the panel; and
(c) the magnetic connector electrically interconnected to the illumination element and adapted to being magnetically and electrically coupled to a source of electrical power; and wherein
the power strip comprises a pair of ferromagnetic electrically conductive power bars and a layer of an insulator strip separating the power bars, and wherein
the magnetic connector comprises:
(i) a pair of electrically conductive side panels;
(ii) an electrically non-conductive spacer sandwiched between the side panels; and
(iii) a pair of magnet bars fixed to the spacer in such a manner that an air gap is present between the magnet bars and such that electrical contact is established between the magnet bars and a respective one of the side panels, wherein
the magnet bars are capable of magnetic and electrical coupling to a respective one of the power bars so as to supply electrical power to the illumination element.

12. The system as in claim 11, further comprising lead wires electrically connecting the illumination element and a respective one of the side panels.

13. A shelf lighting system comprising:
a self-illuminated panel unit,
a power strip for supplying electrical power to the panel unit; and
a magnetic connector electrically interconnected to the LED strip and adapted to being magnetically and electrically connected to the power strip so as to provide electrical power to the LED strip therefrom, wherein
the self-illuminated panel unit includes:
(i) a light-transmissive panel;
(ii) a shelf frame holding the panel; and
(iii) an LED strip housed within one member of the frame and positioned adjacent to an edge of the panel for providing illumination to the panel, wherein
the magnetic connector comprises:
(a) a pair of electrically conductive side panels;
(b) an electrically non-conductive spacer sandwiched between the side panels; and
(c) a pair of magnet bars fixed to the spacer in such a manner that an air gap is present between the magnet bars and such that electrical contact is established between the magnet bars and a respective one of the side panels, and wherein
the magnet bars provide magnetic and electrical coupling with a respective one of the power bars so as to in turn supply electrical power to the LED strip.

14. The system of claim 13, wherein the power strip comprises a pair of ferromagnetic electrically conductive power bars and a layer of an insulator strip separating the power bars.

15. The system as in claim 13, further comprising lead wires electrically connecting the LED strip and a respective one of the side panels.

16. A shelf lighting system comprising:
a self-illuminated panel unit, and
an electrical connector adapted to connect the illumination element to a source of electrical power, wherein
the self-illuminated panel unit comprises:
(i) a light-transmissive panel;
(ii) a frame having a channel for holding respective edges of the panel;
(iii) an illumination element received within the channel of the frame for providing a light source to illuminate the panel, and
(iv) a magnetic connector electrically interconnected to the illumination element and adapted to being magnetically and electrically coupled to a source of electrical power, wherein
(v) the illumination element comprises an LED strip housed within the channel of the frame and positioned adjacent to one edge of the panel, and wherein
(vi) the panel unit further comprises a resilient cushion member received within the channel of the frame member at a position opposite to the LED strip for exerting a bias force on another edge of the panel in a direction to cause the one edge of the panel to abut against the LED strip, wherein
the magnetic connector comprises:
(a) a pair of electrically conductive side panels;
(b) an electrically non-conductive spacer sandwiched between the side panels; and
(c) a pair of magnet bars fixed to the spacer in such a manner that an air gap is present between the magnet bars and such that electrical contact is established between the magnet bars and a respective one of the side panels.

17. The system of claim 16, further comprising edge gaskets for the panel, wherein the LED strip includes spaced-apart LED elements which abut the one edge of the panel, and wherein other edges of the panel are received within respective ones of the edge gaskets, the edge gaskets in turn being positioned within the receiving channel of the frame member.

18. The system as in claim 16, further comprising lead wires electrically connecting the illumination element and a respective one of the side panels.

19. The system as in claim 18, further comprising shrink wrapped tubing around the lead wires.

20. The self-illuminated panel unit as in claim 1 or 7, in the form of a shelf, door panel, wall panel, cabinet base panel, display case panel, furniture panel and flowing panel.

* * * * *